US011868090B2

(12) United States Patent
Zaugg

(10) Patent No.: US 11,868,090 B2
(45) Date of Patent: Jan. 9, 2024

(54) ON-DEMAND HOROLOGICAL DISPLAY MECHANISM

(71) Applicant: Montres Breguet S.A., L'Abbaye (CH)

(72) Inventor: Alain Zaugg, Le Sentier (CH)

(73) Assignee: Montres Breguet S.A., L'Abbaye (CH)

( * ) Notice: Subject to any disclaimer, the term of this patent is extended or adjusted under 35 U.S.C. 154(b) by 519 days.

(21) Appl. No.: 17/060,402

(22) Filed: Oct. 1, 2020

(65) Prior Publication Data

US 2021/0181681 A1 Jun. 17, 2021

(30) Foreign Application Priority Data

Dec. 16, 2019 (EP) .................................... 19216415

(51) Int. Cl.
*G04B 19/243* (2006.01)
*G04B 47/06* (2006.01)

(52) U.S. Cl.
CPC ..... *G04B 19/24306* (2013.01); *G04B 47/066* (2013.01); *G04B 47/068* (2013.01)

(58) Field of Classification Search
CPC ............ G04B 19/24305; G04B 47/068; G04B 19/24306
See application file for complete search history.

(56) References Cited

U.S. PATENT DOCUMENTS

2008/0205200 A1 8/2008 Spode et al.
2012/0020192 A1 1/2012 Calabrese
2012/0182839 A1* 7/2012 Journe ................. G04B 19/223 368/23
2014/0269218 A1* 9/2014 Herold ................. G04B 45/00 368/10
2016/0320754 A1 11/2016 Lagorgette et al.

FOREIGN PATENT DOCUMENTS

| | | | |
|---|---|---|---|
| CN | 101276200 | A | 10/2006 |
| CN | 102346426 | A | 2/2012 |
| CN | 105829978 | A | 8/2016 |
| CN | 109765775 | A | 5/2019 |
| EP | 1 959 317 | A1 | 8/2008 |
| EP | 1 959 317 | B1 | 8/2008 |

(Continued)

OTHER PUBLICATIONS

Translation of JP2014102189, Kondo A, Jun. 2014.*
(Continued)

*Primary Examiner* — Renee S Luebke
*Assistant Examiner* — Matthew Hwang
(74) *Attorney, Agent, or Firm* — Oblon, McClelland, Maier & Neustadt, L.L.P.

(57) ABSTRACT

On-demand horological display mechanism, including a plurality of primary mechanisms each capable of determining the value of a variable, and at least one actuator that can be maneuvered by a user for the selection of the display of the instantaneous values of a specific variable determined by one of the primary mechanisms, each display being performed by the cooperation of a moveable display including a hand or a disc, with a complementary display including at least one graduated index, where the display and/or the complementary display is common to all of the displays that the display mechanism may produce.

17 Claims, 3 Drawing Sheets

(56) References Cited

FOREIGN PATENT DOCUMENTS

| | | | | |
|---|---|---|---|---|
| EP | 2 410 388 | A1 | | 1/2012 |
| EP | 2 410 388 | B1 | | 1/2012 |
| EP | 2 887 158 | A1 | | 6/2015 |
| JP | 8-220257 | A | | 8/1996 |
| JP | 2008-197112 | A | | 8/2008 |
| JP | 2012-98285 | A | | 5/2012 |
| JP | 2014-102189 | A | | 6/2014 |
| JP | 2014102189 | A | * | 6/2014 |

OTHER PUBLICATIONS

Chinese Office Action and Search Report dated Jun. 6, 2022, in Chinese Patent Application No. 202011485453.X, 11 pages.

European Search Report dated Jun. 2, 2020 in European Application 19216415.0 filed Dec. 16, 2019 (with English Translation of Categories of Cited Documents), 3 pages.

Combined Chinese Office Action and Search Report dated Nov. 30, 2021 in Patent Application No. 202011485453.X (with English translation of Category of Cited Documents), 7 pages.

* cited by examiner

ON-DEMAND HOROLOGICAL DISPLAY MECHANISM

CROSS-REFERENCE TO RELATED APPLICATION

This application claims priority to European Patent Application No. 19216415.0 filed on Dec. 16, 2019, the entire disclosure of which is hereby incorporated herein by reference.

FIELD OF THE INVENTION

The invention relates to an on-demand horological display mechanism, including a plurality of primary mechanisms each capable of determining the value of a variable, and at least one actuator that can be maneuvered by a user for the selection of the display of the instantaneous value of a specific variable determined by one of the primary mechanisms, each display being performed by the cooperation of a moveable display, including a hand or a disc, with a complementary display including at least one graduated index.

The invention also relates to a timepiece, in particular a watch, including at least one such display mechanism.

The invention relates to the field of horological display mechanisms.

BACKGROUND OF THE INVENTION

Timepieces with complications are sought after by users, but the displays quickly become difficult to read when same relate to a wide variety of variables to be displayed. The small size of the markings makes the difficulty of reading worse. In addition, there is a risk of confusion by the user if each display is not unequivocal.

Document EP1959317A1 in the name of MAURICE LACROIX describes a gear shifting or transmission switching mechanism intended to be integrated into a horological movement and including a gear pinion rotated by a first wheel of the movement so as to represent a first piece of information to be displayed. An element holding a first fly-back heart-piece is freely mounted on the gear pinion, and is rotated by the first or by a second wheel of the movement so as to represent a second piece of information to be displayed, a second fly-back heart-piece being attached to the gear pinion, a gear wheel being freely mounted about the gear pinion and holding a first, respectively a second, hammer pretensioned by a first, respectively second, pretensioned spring against the first, respectively second, heart-piece, a shift wheel being rotatably mounted on the periphery of the gear wheel and holding a first, respectively a second, cam acting on the first, respectively second hammer so as to remove alternately the contact between the first hammer and the first heart-piece, respectively the second hammer and the second heart-piece, in order to shift the position of the gear wheel according to the first, respectively the second, piece of information to be displayed, an intermediate control wheel being freely mounted about the gear pinion, and engaging with the shift wheel, the intermediate control wheel being attached to a control wheel that can be rotated in a controlled manner via a control mechanism of the gear mechanism.

Document JP H08 220257 in the name of RHYTHM WATCH describes a multi-functional display timepiece capable of clearly showing the time and other information. The first dial has the first time index for displaying a portion of time, and the first information index for displaying information other than the time. Similarly, a second dial has the second time index hiding the first information index of the first dial and complementing the first time index. In this case, a time indicated with the first time index and the second time index, and the information indicated with the first information index may be clearly selected in order to be displayed by moving the second dial.

Document EP2887158A1 in the name of ETA SA Manufacture Horlogere Suisse describes a device for setting watches arranged to be pressed onto the crystal of a watch including a plurality of display means. Said device is arranged to enable a user to see said display means of said watch during the setting thereof, said device including at least one indexing mark for the angular indexing thereof in relation to a reference of said watch, and said device includes, for at least one specific display of said watch, at least one complementary piece of information in relation to said specific display of said watch to facilitate the setting of said specific display considered.

SUMMARY OF THE INVENTION

In a known manner, watches may display indications by means of hands or apertures. It is also known that memory systems make it possible to display two indications on demand on the same display, for the same variable.

The invention proposes to make it possible to display two indications of different variables, or having different units, on the same display support, and particularly but not limited to, to produce the combination of the display of the months and of the date on the same display.

Thus, the invention proposes to provide the user of a watch reliable information relative to the variable of which they observe the position, with a simplified display, and advantageously of larger size than in the known mechanisms.

To this end, the invention relates to an on-demand horological display mechanism, according to claim 1.

The invention also relates to a timepiece, in particular a watch, including at least one such display mechanism.

SUMMARY DESCRIPTION OF THE DRAWINGS

Other features and advantages of the invention will become apparent upon reading the following description, with reference to the appended drawings, where:

Figure 1:
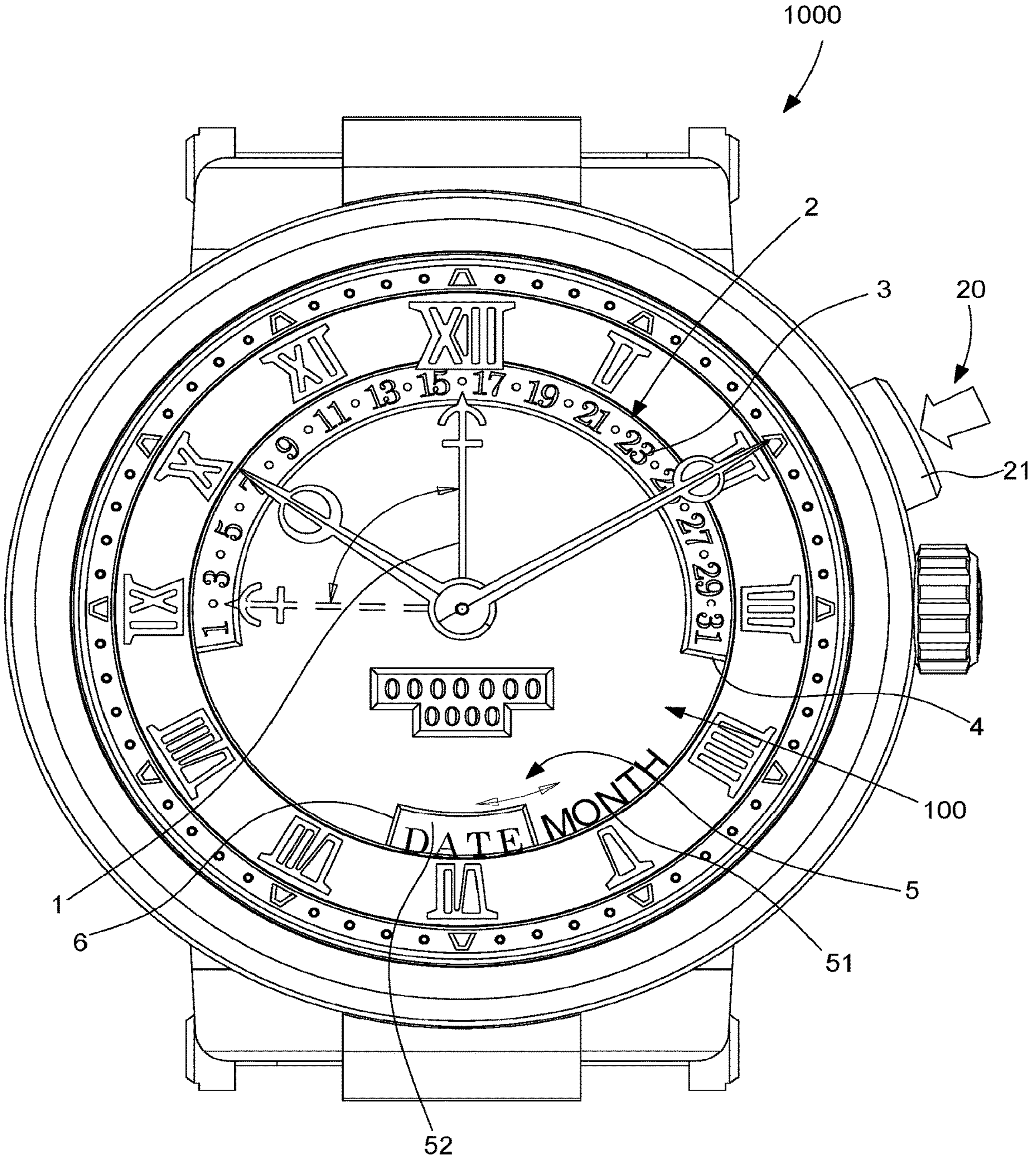
FIG. 1 shows, schematically, and in front view, a watch including an on-demand display mechanism according to the invention, switchable between a date display position and a current month display position, by the same hand and on the same graduated sector.
Figure 5:
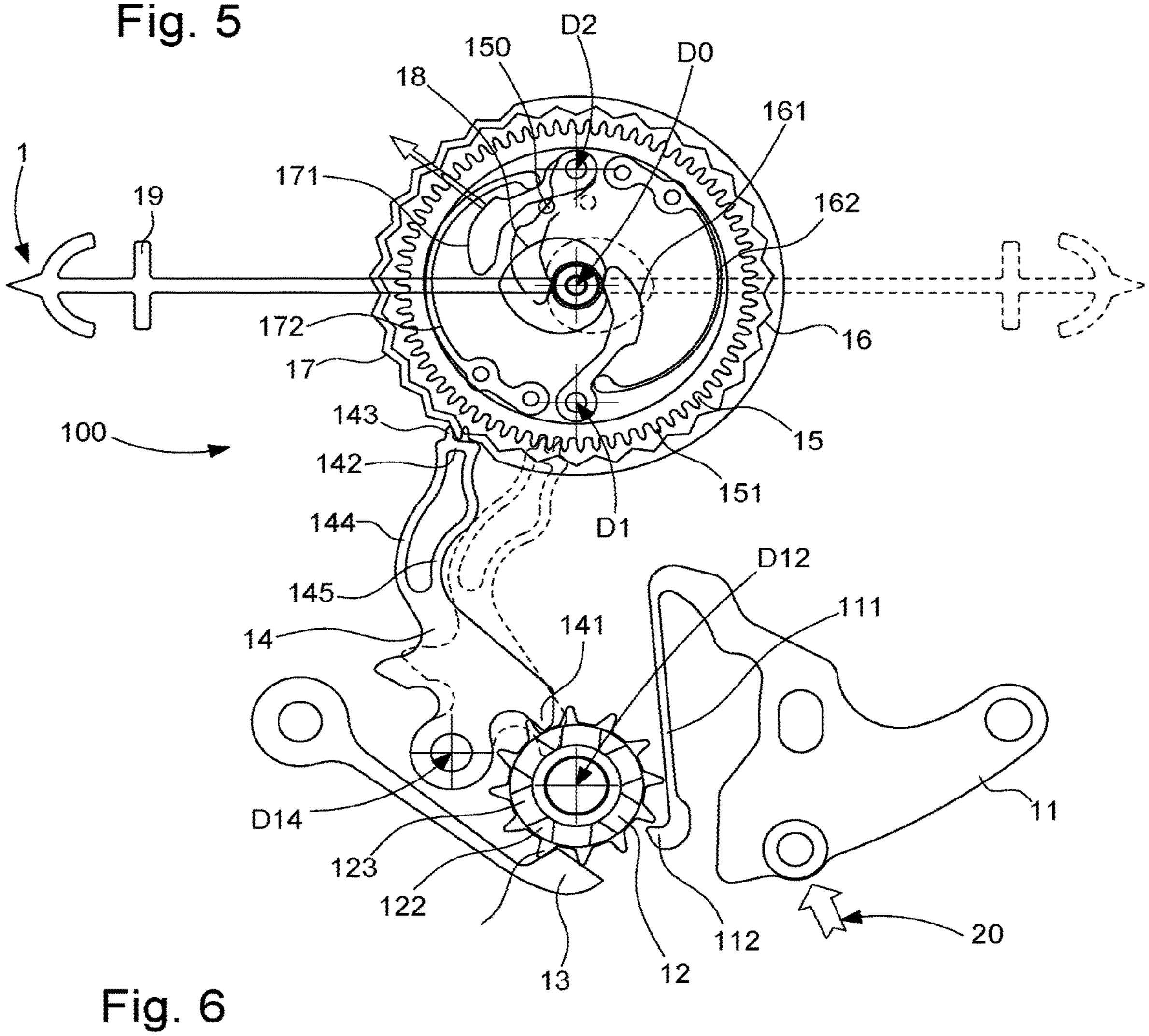
Figure 6:
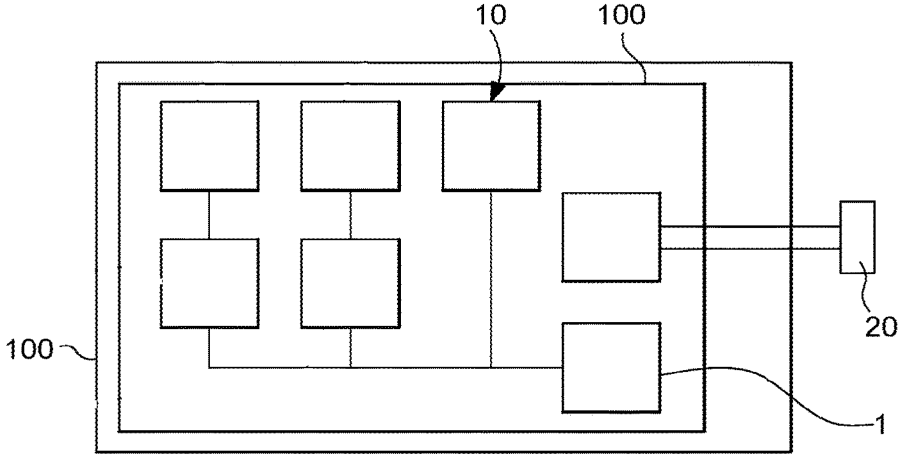

FIG. 5 shows, in a manner similar to FIG. 1, such a mechanism for displaying on demand the current month or the date, including an actuator for the control of a column wheel itself controlling the position of an operating lever of a lifting-lever, which lifting-lever forms a stage of a block of coaxial and superimposed mobile components also including a month wheel equipped with a month lever and a month spring and able to interfere with said lifting-lever, a day wheel equipped with day lever and a day spring, and a display mobile component bearing a hand and a control heart-piece that is capable of cooperating both with the day lever with which same is in permanent contact, and with the month lever with which same is in contact during an action by the user on the button of the actuator;

FIG. 6 is a block diagram showing a watch with a plurality of such display mechanisms.

DETAILED DESCRIPTION OF PREFERRED EMBODIMENTS

The invention relates to an on-demand horological display mechanism 100, including a plurality of primary mechanisms 10 each capable of determining the value of a variable, and at least one actuator 20 that can be maneuvered by a user for the selection of the display of the instantaneous value of a specific variable determined by one of the primary mechanisms 10. Each display is performed by the cooperation of a moveable display 1, including an hand or a disc, with a complementary display 2 including at least one graduated index 3.

The display 1 and/or the complementary display 2 is common to all of the displays that the display mechanism 100 may produce.

More particularly, both the display 1 and the complementary display 2 are common to all of the displays that the display mechanism 100 may produce.

More particularly, the complementary display 2 includes a plurality of graduated indexes 3 each corresponding to the display of the value of a specific variable.

According to the invention:

either the complementary display 2 is moveable in relation to a window 4, so as to show, at a given moment, only one graduated index 3 for the user to view;

or the display mechanism 100 includes a window 4 that is moveable above the complementary display 2, so as to show, at a given moment, only one graduated index 3 for the user to view.

More particularly, the display mechanism 100 includes a single disc, which holds all of the graduated indexes 3.

More particularly, the display mechanism 100 includes a variable indicator 5 associated with each graduated index 3 for displaying for the user to view the name of the variable of which the value is displayed at a given moment, or of a symbol representing said variable.

In one variant, such a variable indicator 5 is moveable in relation to an aperture 6, so as to show, at a given moment, only one variable name or symbol for the user to view.

In another variant, the display mechanism 100 includes an aperture 6 that is moveable above the variable indicator 5, so as to show, at a given moment, only one variable name or symbol for the user to view.

More particularly, the display mechanism 100 includes a single disc, which holds all of the variable indicators 5.

Even more particularly, the display mechanism 100 includes the same single disc that holds all of the graduated indexes 3 and all of the variable indicators 5.

More particularly, each of the primary mechanisms 10 is a mechanical memory mechanism. Even more particularly, when the display mechanism 100 includes an aperture 6, said mechanical memory mechanism is arranged to control the relative position between the variable indicator 5 and the aperture 6. In one specific embodiment, at least one mechanical memory mechanism is a mechanism including at least one memory wheel, in particular such as described in document EP2362276B1 in the name of MONTRES BREGUET SA.

More particularly, the actuator 20 is arranged to be actuated by a simple press by the user, in order to control the change of display from the value of one variable to the value of another variable, according to a fixed sequence of various variables.

In one variant, the actuator 20 is arranged to take, upon action by the user, various positions each corresponding to the display of the value of a different variable.

More particularly, the moveable display 1 is a retrograde display.

More particularly, the display mechanism 100 relates to variables that all have different units.

More particularly, one of the primary mechanisms 10 is a month display.

The invention lends itself well to a wide variety of primary mechanisms 10, in particular and not limited to:

date display mechanism;

power reserve display mechanism;

striking-work mode display mechanism;

day/night display mechanism;

AM/PM display mechanism;

time zone display mechanism;

ambient pressure display mechanism;

ambient temperature display mechanism.

The invention also relates to a timepiece 1000 including at least one such display mechanism 100.

The invention is illustrated for a specific, non-limiting, case where the mechanism according to the invention makes it possible to perform the function of displaying two distinct horological values by the same display, here the same hand. In said example illustrated in FIGS. 1 and 5, the primary mechanisms 10 are a date mechanism and a month mechanism, which may naturally include common elements.

Figure 2:
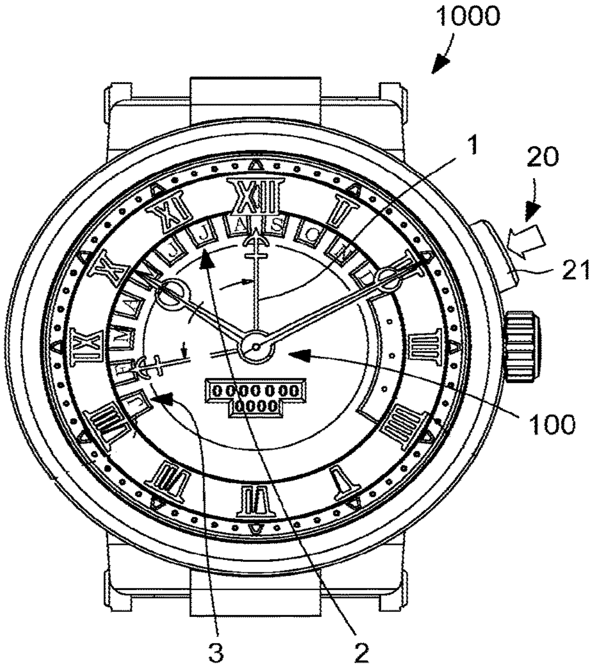
FIG. 2 shows, in a manner similar to FIG. 1, another watch including a ring with apertures and a graduated ring in numerals for days and in letters for months, moveable in relation to one another, shown in a month display position.
Figure 3:
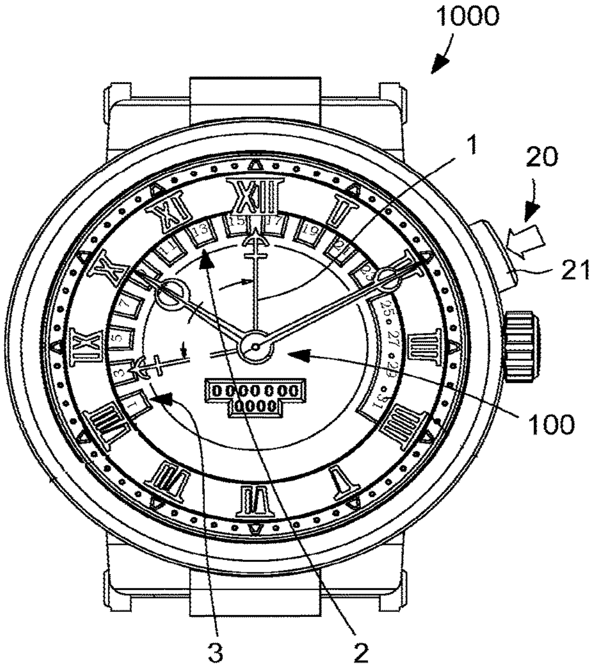
FIG. 3 shows, in a manner similar to FIG. 1, another watch including a ring with apertures and a graduated ring in numerals for days and in letters for months, moveable in relation to one another, shown in a date display position.
Figure 4:
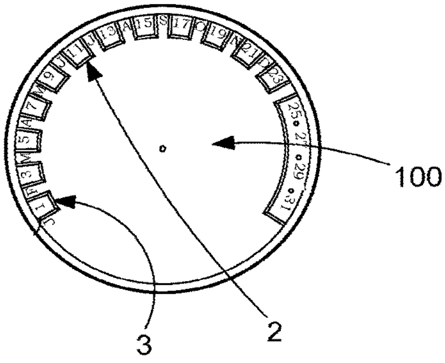
FIG. 4 shows, in a manner similar to FIG. 1, a disc of such a watch including a scale graduated by alternation of numerals for days and letters for months.

This specific embodiment makes it possible to obtain the configuration visible in FIGS. 1 and 2, with the display of the date and of the month, alternatively by pressing a button, and twelve equidistant dates, in particular twelve successive dates, in particular the first twelve dates, serving as month number. FIG. 1 illustrates the date display position, and FIG. 2 the current month display position.

In a particular manner, the actuator 20 is arranged to control the position of a column wheel 12 determining the position of an operating lever 14 arranged for the control of a lifting-lever 15, which is arranged to uncouple one of the primary mechanisms 10 from the display 1 in an inactive state of the actuator 20, and to couple same to the display 1 when the actuator 20 is activated, and so as to then exert on the display 1 a torque greater than same that another primary mechanism 10 that the display mechanism 100 includes exerts on display 1.

Preferably, but not limited to, the lifting-lever 15 is coaxial with three other mobile components, the superimposition thereof includes four levels, a first level including a display mobile component including the display 1 that is integral with a display heart-piece 18, which also extends over a second level and a third level, the second level including a first wheel 16 of a first primary mechanism 10 holding a first lever 161 returned on the display heart-piece 18 by a first spring 162, the third level including a second wheel 17 of a second primary mechanism 10 holding a second lever 171 returned on the display heart-piece 18 by a second spring 172, and a fourth level including the lifting-lever 15 that holds a locking element or a pin 150, extending in the third level so as to interact with the second lever 171 in order to keep same away from the display heart-piece 18 in the absence of action by the user on the actuator 20.

Thus, the display mechanism 100 includes here:

- an actuator 20 that controls the pivoting of a first operating lever 11 in order to control the rotation of a column wheel, or similar; said first operating lever 11 includes an elastic arm 111 holding a drive finger 112 at the distal end thereof;
- a column wheel 12, pivoting about an axis D12, which conventionally holds an outer toothing 121 with which cooperates the finger 112 for the driving thereof, and the notched central portion including an alternation of columns 123 and of recesses 122 and; said column wheel 12 is held in position by a column wheel jumper 13;
- a second operating lever 14, pivoting about an axis D14, for the control of a memory lifting-lever and date/month display; said second operating lever 14 includes a catch 141 arranged to cooperate with a recess 122 of the column wheel 12, in certain relative positions, and such as visible in the position shown in dotted line; same also includes an arm 142, holding one or more teeth 143 at the distal end thereof, two teeth in the case of FIG. 5; more particularly, said arm 142 is an elastic arm the body of which is made of elastic strips 144 and 145;
- a memory lifting-lever 15, rotatable about the axis DO, and which includes a toothing 151 with which in turn cooperates each tooth 143 of the second operating lever 14;
- a date wheel 16, also rotatable about the axis DO, and driven by a conventional date mechanism not described here, and that includes 31 teeth;
- a month wheel 17, also rotatable about the axis DO, and driven by a conventional month mechanism not described here, and that includes 12 teeth, which only occupy a portion of the circumference of said month wheel 17;
- a display heart-piece 18 and a display mobile component or wheel, rotatable about the axis DO;
- a moveable display 1, here consisting of a date and month hand 19.

The date wheel 16 holds a day lever 161, pivoting about the axis D1, and that is activated by a day spring 162 that provides the connection thereof with the display heart-piece 18 by default.

The month wheel 17 in a similar manner holds a month lever 171, pivoting about the axis D2, and that is activated by a month spring 172, and that is controlled by the memory lifting-lever wheel 15. The month spring 172 thereof is dimensioned to be capable of controlling the display heart-piece 18 when the memory lifting-lever 15 is deactivated despite the day lever 161 of the date wheel 16.

It is understood that four mobile components are mounted coaxial about the axis D0, and superimposed:

- on a first level a display mobile component or wheel includes the hand 19 that is integral with the display heart-piece 18, which also extends over a second level and a third level;
- said second level is same of the date wheel 16, and where the cam of the heart-piece is arranged to cooperate with the day lever 161;
- said third level is same of the month wheel 17, and where the cam of the heart-piece is arranged to cooperate with the month lever 171;
- on a fourth level extends the memory lifting-lever 15, the pin 150 of which extends in the third level so as to interact with the month lever 171; by default the pin 150 keeps the month lever 171 away from the heart-piece 18. It is only when the second operating lever 14 controls the rotation of the lifting-lever 15 that the pin 150 changes position, moving from the position at 11 o'clock to the position at 1 o'clock in FIG. 5, in relation to the axis D0, the strong month spring 171 then searches for the stable position of the heart-piece 18, while overcoming the opposite resistant torque by the day spring 162, the day lever 161 always being in contact with the heart-piece 18.

The second operating lever 14 is advantageously used to hold or control the indication of the display mode in progress, by holding a variable indicator 5 such as a moveable indicator pallet-stone or a moveable aperture, or by controlling via a train or similar the rotation of such a moveable indicator pallet-stone or such a moveable aperture, in order to perform the display of a date/month indication as in FIG. 1, or in order to display a suitable scale such as for example J-F-M-A or 9-11-13-15-17, etc., in FIG. 5, respectively for the months or the dates. The second operating lever 14 may also hold a hand, on the axis thereof, which, due to the angular travel thereof, makes it possible to display the date/month on the dial graduations.

The starting state is positioned as being a display of the date. Said state corresponds to the solid-line representations in FIG. 5. The date/month display is then in "date" position.

The display is connected by the control heart-piece 18 and the day lever 161 of the date wheel 16 to same, therefore the display indicates the angular position of the date wheel 16.

When the user presses the actuator 20, in particular a button, of the watch 1000, the operating lever 11 that controls the column wheel 12 makes same rotate by one pitch. In a known manner of the operation of column wheels, a pitch replaces a column 123 by a recess 122, the second operating lever 14 for controlling the memory lifting-lever, which was resting on a column 123 therefore falls in active position in a hollow 122 (dotted-line position). The date/month display that is controlled by the second operating lever 14 for controlling the lifting-lever changes and then displays "month" instead of "date".

The second operating lever 14 for controlling the memory lifting-lever drives the memory lifting-lever 15, the pin 150 of which releases the month lever 171 of the month wheel 17. As the torque imparted by the month spring 172 of said month lever 171 is higher than same imparted by the day spring 162 of the date lever 161, the control heart-piece 18 aligns on the angular position of the current month, by driving the hand 19 towards the corresponding position.

A new press on the button 20 brings the parts back into initial position.

Said variant illustrated in FIGS. 1 and 5 allows a rotation of the hand 19 about 360°. Naturally, said mechanism may be produced in a retrograde manner.

FIG. 1 shows a display of the months and of the retrograde date on a single hand, the hand displays the months or the date alternatively during the press on the button 21 located at two o'clock. The aperture 6 at six o'clock indicates the units of the display, in this case: date indicator 52/month indicator 51.

FIG. 2 shows a display of the months and of the retrograde date on a single hand, the hand displays the months or the date alternatively during the press on the button 21 located at two o'clock. The apertures/index of the retrograde arranged over 240° of the position at eight o'clock up to the position at four o'clock alternatively indicate the units of the display, in this case: 1-3-5-7-9-11-13 . . . 21 and J-F-M-A-M-J-J-A-S-O-N-D.

One variant of the invention consists in directly controlling by a button 20 the second control 14; in this case, two stable states do not exist, but the display is permanently on the date, except during the press on the actuator 20 which changes to the display of the month, and reverts back to the date when the button is released.

In short, a watch according to the invention uses known memory mechanisms to display by a hand and on demand, alternatively the date and the month. The memory mechanism uses here a combination of heart-piece and springs, other mechanisms are possible.

The mechanism also includes a display by aperture of the units, which is controlled by the memory mechanism so as to coordinate the units with the value of the hand.

Other displays having different units may be coupled, for example, date and power reserve, temperature, striking-work, etc.

The invention makes it possible to simplify the display of the watch, to provide an interesting animation for the user, to enable a discrete display of the variables the least used, such as here the month display, and to make possible memory displays with values having different units.

The invention claimed is:

1. An on-demand horological display mechanism, comprising:

a plurality of primary mechanisms each capable of determining a value of a variable, and at least one actuator that can be maneuvered by a user for a selection of a display of an instantaneous value of a specific variable determined by one of said primary mechanisms, wherein each said display being performed by the cooperation of a moveable display including a hand or a disc, with a complementary display including at least one graduated index, wherein said moveable display or/and said complementary display is common to all of the displays of the instantaneous value of specific variables that said display mechanism may produce, where said complementary display includes a plurality of said graduated indexes each corresponding to the display of the value of a specific variable, and wherein, the display mechanism includes a window that is moveable above said complementary display so as to show, at a given moment, only one said graduated index for the user to view.

2. The display mechanism according to claim 1, wherein said display mechanism includes a single disc holding all of said graduated indexes.

3. The display mechanism according to claim 1, wherein said display mechanism includes a variable indicator associated with each of said graduated indexes for displaying for the user to view the name of the variable of which the value is displayed at a given moment.

4. The display mechanism according to claim 3, wherein said display mechanism comprises an aperture that is moveable above said variable indicator, so as to show, at a given moment, only one said variable name for the user to view.

5. The display mechanism according to claim 3, wherein said display mechanism comprises a single disc holding all of said variable indicators.

6. The display mechanism according to claim 2, wherein said display mechanism includes a single disc holding all of said variable indicators, and wherein said display mechanism includes the same single disc holding all of said graduated indexes and all of said variable indicators.

7. The display mechanism according to claim 1, wherein each of said primary mechanisms is a mechanical memory mechanism.

8. The display mechanism according to claim 7, wherein each of said mechanical memory mechanisms is arranged to control the relative position between said variable indicator and said aperture.

9. The display mechanism according to claim 7, wherein at least one of said mechanical memory mechanisms is a mechanism including at least one memory wheel.

10. The display mechanism according to claim 1, wherein said actuator is arranged to be actuated by a press by the user, in order to control the change of display from the value of one variable to the value of another variable, according to a fixed sequence of various variables.

11. The display mechanism according to claim 1, wherein said actuator is arranged to take, upon action by the user, various positions each corresponding to the display of the value of a different variable.

12. The display mechanism according to claim 1, wherein said moveable display is a retrograde display.

13. The display mechanism according to claim 1, wherein said display mechanism relates to variables that all have different units.

14. The display mechanism according to claim 1, wherein one of said primary mechanisms is a month display, or a date display mechanism, or a power reserve display mechanism, or a striking-work mode display mechanism, or a day/night display mechanism, or an AM/PM display mechanism, or a time zone display mechanism, or an ambient pressure display mechanism, or an ambient temperature display mechanism.

15. The display mechanism according to claim 1, wherein said at least one actuator is arranged to control the position of a column wheel determining the position of an operating lever arranged for the control of a lifting-lever, which is arranged to uncouple one of said primary mechanisms from said moveable display in an inactive state of said at least one actuator, and to couple same to said moveable display when said actuator is activated, and so as to then exert on said moveable display a torque greater than another torque that another said primary mechanism that said display mechanism includes, exerts on said display.

16. The display mechanism according to claim 15, wherein said lifting-lever is coaxial with three other mobile components, and that the superimposition thereof includes four levels, a first level including a display mobile component including said display that is integral with a display heart-piece, which also extends over a second level and a third level, said second level including a first wheel of a first primary mechanism holding a first lever returned on said display heart-piece by a first spring, said third level including a second wheel of a second primary mechanism holding a second lever returned on said display heart-piece by a second spring, and a fourth level including said lifting-lever that holds a locking element or a pin, extending in said third level so as to interact with said second lever in order to keep same away from said display heart-piece in the absence of action by the user on said actuator.

17. A timepiece comprising at least one display mechanism according to claim 1.

* * * * *